United States Patent [19]

Miericke

[11] 3,834,317

[45] Sept. 10, 1974

[54] MAGNETIC MOVING VEHICLE SUSPENSION

[75] Inventor: Jürgen Miericke, Nurnberg, Germany

[73] Assignee: Siemens Aktiengesellschaft, Munich, Germany

[22] Filed: Dec. 4, 1972

[21] Appl. No.: 311,566

[30] Foreign Application Priority Data
Dec. 7, 1971 Germany............................. 2160680

[52] U.S. Cl.......................................... 104/148 SS
[51] Int. Cl.......................................... B61b 13/08
[58] Field of Search................ 104/148 MS, 148 SS; 308/10

[56] References Cited
UNITED STATES PATENTS

| | | | |
|---|---|---|---|
| 2,946,930 | 7/1960 | Gilbert................................ | 308/10 |
| 3,589,300 | 6/1971 | Wipf.............................. | 104/148 SS |
| 3,717,103 | 2/1973 | Guderjahn..................... | 104/148 SS |

OTHER PUBLICATIONS

Powell et al., Magnetically Suspended Trains, Cyrogenics and Industrial Gases, Oct. 1969, pages 19–24.

Primary Examiner—M. Henson Wood, Jr.
Assistant Examiner—George H. Libman
Attorney, Agent, or Firm—Kenyon & Kenyon Reilly Carr & Chapin

[57] ABSTRACT

A magnetic moving vehicle suspension has at least two null-flux systems arranged to provide vertical suspension and resistance to rolling of the vehicle, the electric current-carrying magnet loops of these two systems being positioned to cooperatively form a common flux field in a vertical plane between them, and the trackway, in addition to the horizontal electrically conducting track loops of non-magnetic material of these two systems, further including vertical electrically conducting track loops of non-magnetic material cooperating with this common flux field to form a third null-flux system providing resistance to transverse horizontal motion of the vehicle. The magnet loops may be formed by superconductors and the trackway loops may comprise plates made of electrically conductive non-magnetic material, preferably made of several layers of this material laminated together.

12 Claims, 2 Drawing Figures

MAGNETIC MOVING VEHICLE SUSPENSION

BACKGROUND OF THE INVENTION

Magnetic moving vehicle suspensions of the null-flux system type comprise two horizontal electric current-carrying loops forming a pair of loops connected to the vehicle, these loops being parallel to each other and vertically interspaced with their respective currents flowing in opposite directions. Preferably they comprise superconductor loops with the cryogenic equipment carried by the vehicle. The trackway includes a series of track loops arranged parallel to each other, in end-to-end fashion, these loops being made of electrically conductive non-magnetic material. These track loops are horizontally positioned to project or extend between the two vehicle magnet loops and so to be within their flux fields. When the vehicle is moving, the magnet loops induce eddy currents in the track loops which suspend the vehicle within the field of the magnet loops. These eddy currents in the track loops increase or decrease as required to maintain the magnet loops, and therefore the vehicle, at a position of equilibrium. At this position practically no currents are generated in the track loops which is why a system of this type is called a null-flux system, or sometimes a zero-flux system.

For stability, the trackway may have two series of the track loops which are transversely interspaced, and the vehicle provided with four pairs of the magnet loops at fore and aft positions, thus providing not only for vertical suspension of the moving vehicle, but also resistance to rolling and pitching motion of the vehicle.

DESCRIPTION OF THE PRIOR ART

Proposals for the magnetic suspensions of moving vehicles are relatively old, attention being called to the Bachelet U.S. Pat. No. 1,020,943, dated Mar. 19, 1912.

Various embodiments of null-flux magnetic moving vehicle suspension systems are disclosed by the Powell Jr. et al. U.S. Pat. No. 3,470,828, dated Oct. 7, 1969. In this patent each system includes the two superconducting vehicle or magnet loops, the two loops carrying electric current in opposite directions with respect to one another. The track loops are made of electrically conductive, non-magnetic material and positioned so that the magnet loops induce eddy currents in them whenever there is a deviation from a condition of equilibrium.

The restraint of a transverse vehicle horizontal deviation is described by the publication Cryogenics and Industrial Gases, Oct. 1969, on pages 19 to 24. This involves what might be called the two normal systems using two pairs of the magnet loops providing for vertical suspension and resistance to rolling motion by the vehicle when working with the two series of track loops, plus a third system for transverse horizontal stabilization of the vehicle, a third series of track loops, vertically arranged, being provided which cooperates with a third pair of superconducting magnet loops.

SUMMARY OF THE INVENTION

The object of the present invention is to provide a magnetic moving vehicle suspension providing for vertical support, resistance to rolling motion of the vehicle and also transverse stabilization of the vehicle but without requiring the expense of a third set of superconducting magnet loops on the vehicle.

This object is attained by the provision of two pairs of magnet loops, each having at least one track loop and forming two null-flux systems transversely interspaced with respect to the vehicle's traveling direction. These current carrying loops, or vehicle magnet loops, of the two systems are positioned closely enough together to form an effective common magnetic field between them, so that in conjunction with at least one other track loop working within this third magnetic field, a third one of the systems is formed without requiring a third set of the superconducting magnet loops on the vehicle.

The track loops for the two systems, keeping in mind that there are a succession of these loops positioned end-to-end to form the trackway, may be positioned horizontally with the magnet loops of these two systems riding above and below them to form the two null-flux magnetic suspension systems. For the third system, the track loops, of which there are also many end-to-end, are positioned vertically with the magnet loops of the two systems riding along them in end-wise fashion on either side of these vertical loops.

The third series of trackway loops may be arranged so that in cross section they form a cross, the loops, of course, all being electrically insulated from each other. This permits the superconducting magnet pairs of the two systems providing vertical support and rolling stabilization to be positioned transversely closely together endwise to provide an effective magnetic field between them inducing currents in the vertical trackway loops whenever there is a horizontal deviation from the condition of equilibrium.

The above construction is particularly advantageous when the trackway is elevated with the vehicle suspended below the trackway, but it can be used with a trackway on the ground and the vehicle suspended above the trackway and, of course, two trackways can be used, one above and one below the vehicle.

The horizontal track loops may lie in a plane intersecting the vertical loops and the point of intersection may be positioned slightly above the vertical center of these vertical loops so that if the weight of the vehicle shifts the magnet loops downwardly, the vertical loops will be symmetrically within the common field formed by the two pairs of magnet loops.

In addition, the trackway may include a magnetic member in the form of a flat lengthwise extending plate or plates which are above and in the field of the two pairs of superconducting magnet loops so that the latter, and therefore the vehicle, receives a lifting force. This force may be made to just about equal the weight of the vehicle which will restrict the above-referred to downward motion of the magnet loops to a substantial extent and thus keep the vertical loops more squarely within the common field of the two pairs of magnet loops. To prevent this lifting effect from becoming excessive, plates of non-magnetic electrically conducting material can be placed above the magnetic members on the trackway and by proper design of the magnetic members, such as be appropriately proportioning their cross sectional size, excessive lifting will result in magnetic saturation of the magnetic members so there is no further lifting action, while the magnetic field of the superconducting magnet loops cause eddy currents to be induced in the non-magnetic trackway members above the magnetic trackway members, so as to result in a downward position restoring force.

The track loops preferably comprise flat plates of non-magnetic electrically conductive material such as aluminum, as contrasted to being loops of aluminum wire or the like. Preferably these plates are of laminated layer construction to give the advantage that only the components of the induced eddy currents in planes parallel to the planes of the vehicle magnet loops which generate these eddy currents, are effective for the generation of force. Such components in a direction perpendicular to the flat sides of the plates can generate only braking force and, therefore losses. With the laminated layers these undesirable components are substantially reduced and in some cases practically canceled.

DESCRIPTION OF THE DRAWINGS

Preferred embodiments of the invention are illustrated somewhat schematically by the accompanying drawings in which.

DESCRIPTION OF THE PREFERRED EMBODIMENTS

Figure 1:
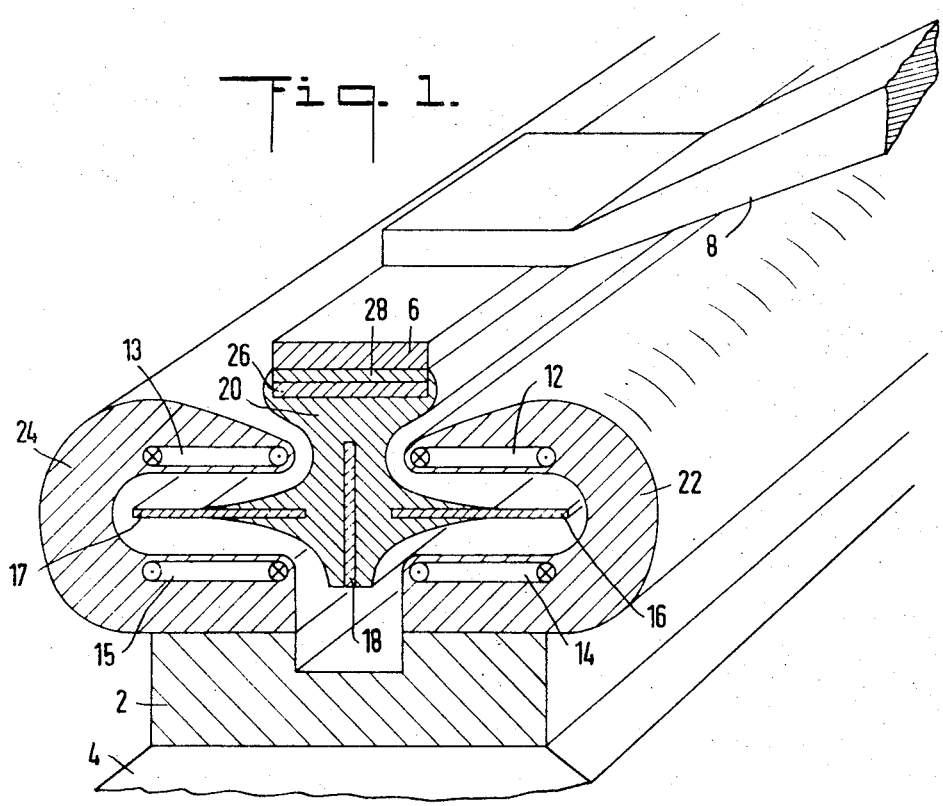
FIG. 1 is a cross-sectioned, perspective view showing the details of the invention.

Having reference to the above drawings, the upper part 2 of a suspended vehicle 4, only schematically represented, is provided with the magnetic suspension of the present invention.

The trackway mounting 6 is supported by cantilever arms 8 mounted overhead by a suitable structure (not shown). The superconducting electric current-carrying loops are shown at 12 through 15, the crosses indicating the opposite polarities of the current flows. The loops 12 and 14 of one system are vertically interspaced with the loops parallel to each other, the same relationship holding for the other pair of magnet loops 13 and 15 of the second system. The two pairs are positioned relatively closely together so that in addition to the magnetic fields they create by the vertical cooperation of their loops, they create an effective third magnetic field endwise or transversely between them.

The horizontal flat, non-magnetic electrically conductive plates, made of laminated layers of aluminum, for example, 16 and 17, form track loops within the fields of the magnet loops which extend vertically between them, and the third track loop 18, correspondingly made, is positioned vertically between the fields created horizontally between the loops 12 and 13 and between the loops 14 and 15. These three trackway loops 16 through 18 are mounted by a non-magnetic body 20 of suitable strength and which is connected to the trackway mounting member 6.

The superconducting loop pairs 12 and 14 and 13 and 15 are mounted by non-magnetic and electrically non-conductive yokes 22 and 24, respectively. These yokes are of adequate mechanical strength to support the loading of the vehicle 4 connected with and suspended by them.

The magnetic trackway members are shown at 26 as comprising a flat plate-like member made of ferromagnetic material and extending lengthwise of the trackway, or there may be a series of these members arranged end-to-end as, of course, are the trackway loops 16 through 18. This member 26 is effectively within the field of the magnet loops 12 and 13, to provide the lift previously described.

This magnetic plate member 26 is cross-sectionally dimensioned so that if the vehicle and therefore the loops 12 and 13 lift excessively, the member becomes magnetically saturated and cannot exert further lifting effect. The normal lift might be just sufficient to balance the vehicle's weight which would serve to keep the vertical track loop 18 symetrically within the field formed cooperatively by the two magnet pairs. Although not shown, the plane of the track loops 16 and 17 may intersect the loop 18 a little above its vertical center so that a downward displacement brings it symetrically within the common field formed by the two pairs of magnet loops.

A plate or plates 28 of non-magnetic electrically-conductive material, such as aluminum, is positioned above the member 26 to form what might be called a fourth track loop. This is operative only if the magnet loops lift excessively with this member 26 magnetically saturating the induced eddy currents in this plate or horizontal loop 28 providing a downward position restoring force.

All of the parts 16 through 18, the mounting 20, the plates 26 and 28 and mounting 6 are mechanically interconnected to carry the weight of the vehicle.

Figure 2:
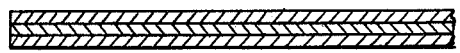
FIG. 2 is a cross section of a portion of one of the laminated layer track loops.

FIG. 2 illustrates in a cross sectional view, a portion of one of the loops such as loops 16, 17 and 18 of FIG. 1. As illustrated, the plate shaped loop is laminated, consisting of individual laminations stacked in the manner of a sandwich system. Three layers of such laminations are illustrated on the figure by the different directions of cross hatchings. It will be noted however, that more than three laminations can be provided. With such an embodiment of a loop, an advantage is obtained in that only the components of the eddy current in the verticle direction with regard to the flat upper and lower sides of the loops are affected while the other components, which generate only braking forces and thus, losses, are substantially reduced and possibly even cancelled in a practical sense. Through this arrangement, the ratio of the lifting force to the braking force can therefor be substantially improved.

What is claimed is:

1. A magnetic moving vehicle suspension in which the vehicle has electric current-carrying magnetic loops arranged substantially parallel to each other and which form with at least one track loop of non-magnetic electrically conductive material a magnetic null-flex suspension system; wherein the improvement comprises the provision of two of said systems each having at least one of said track loops and the two systems being transversely interspaced with respect to the vehicles traveling direction, the current-carrying loops of the two systems cooperatively forming a common magnetic field, and at least another track loop forming with said common field a third one of said systems.

2. The suspension of claim 1 in which the said two of the systems controls at least the vehicle's vertical position and said third system controls at least the vehicle's transverse position.

3. The suspension of claim 1 in which one or more of said track loops is formed by a plate.

4. The suspension of claim 1 in which one or more of said track loops comprises a plurality of superimposed layers forming a plate.

5. The suspension of claim 2 in which the suspension lift is increased by a track member of magnetic material in the field of the magnet loops of the said two of the systems.

6. The suspension of claim 5 in which said member is provided with an adjacent member of non-magnetic material also within said field.

7. The suspension of claim 1 in which each of the said two systems has its magnet loops positioned one above the other and horizontally spaced from the other to form said common field, said track loops being formed by a supported trackway comprising horizontal track loops which oppositely extend between said magnet loops and vertical track loops extending vertically between the mutually adjacent sides of said magnet loops, said trackway having a series of said track loops extending end for end.

8. The suspension of claim 7 in which said trackway includes a lengthwise extending member positioned above and in the magnetic field of said magnet loops and made of magnetic material.

9. The suspension of claim 7 in which said track loops comprise flat plates.

10. The suspension of claim 8 in which said plates are formed by layers in laminated arrangement.

11. The suspension of claim 8 in which said trackway includes a lengthwise extending member made of electrically conductive non-magnetic material positioned to be in the field of said magnet loops when the vehicle moves excessively upwardly.

12. The suspension of claim 11 in which said magnetic material member is designed to reach magnetic saturation when the vehicle moves excessively upwardly.

* * * * *